United States Patent
Ruan et al.

(10) Patent No.: US 11,699,947 B2
(45) Date of Patent: Jul. 11, 2023

(54) DC-DC CONVERTERS WITH LOOP CONTROL

(71) Applicant: TEXAS INSTRUMENTS INCORPORATED, Dallas, TX (US)

(72) Inventors: Jiancong Ruan, Shenzhen (CN); Runqin Tan, Shenzhen (CN); Peisheng Zhu, Shenzhen (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 97 days.

(21) Appl. No.: 17/117,401

(22) Filed: Dec. 10, 2020

(65) Prior Publication Data
US 2021/0184563 A1    Jun. 17, 2021

Related U.S. Application Data

(60) Provisional application No. 62/948,064, filed on Dec. 13, 2019.

(51) Int. Cl.
   *H02M 1/15* (2006.01)
   *H02M 3/158* (2006.01)
(52) U.S. Cl.
   CPC ............. *H02M 1/15* (2013.01); *H02M 3/158* (2013.01)

(58) Field of Classification Search
   CPC ..................... H02M 1/15; H02M 3/156–158
   USPC ......................................................... 323/282
   See application file for complete search history.

(56) References Cited

U.S. PATENT DOCUMENTS

| | | | |
|---|---|---|---|
| 2002/0125872 A1* | 9/2002 | Groom ................... | H02M 3/156 323/288 |
| 2008/0061750 A1* | 3/2008 | Stoichita ............. | H02M 3/1563 323/271 |
| 2008/0088284 A1* | 4/2008 | Weng ................... | H02M 3/1563 323/271 |
| 2012/0217941 A1* | 8/2012 | Chen ...................... | H02M 3/156 323/271 |

* cited by examiner

*Primary Examiner* — Yemane Mehari
(74) *Attorney, Agent, or Firm* — Ray A. King; Frank D. Cimino

(57) ABSTRACT

A converter system (100) includes a switch (102) adapted to be coupled to a switching terminal (104). The switch (102) is configured to generate a switching signal having first and second states at the switching terminal (104). Ripple generating circuitry (122) is adapted to be coupled to the switching terminal (104) and is configured to: generate a filtered signal based on the switching signal; and keep the filtered signal within a particular range. Loop control circuitry (116) is coupled to the ripple generating circuitry (122) and is configured to control the switch (102) based on the filtered signal.

18 Claims, 7 Drawing Sheets

DC-DC CONVERTERS WITH LOOP CONTROL

CROSS-REFERENCE TO RELATED APPLICATION

This application claims priority to U.S. Provisional Patent Application No. 62/948,064 filed Dec. 13, 2019, which is hereby incorporated herein by reference in its entirety.

TECHNICAL FIELD

This description relates generally to integrated circuits, and more particularly to a DC-DC converter circuit with loop control.

BACKGROUND

DC-DC converters are widely used to convert an input voltage to a desired output voltage to drive a load. DC-DC Converters may be specified to have following features: fast load transient response; fixed switching frequency, especially for audio and automotive applications; very small minimum-on time, especially for high frequency applications; supporting high output voltage and large duty cycle; and small output ripple of the output voltage even under a light load condition.

SUMMARY

In described examples, a converter system includes a switch adapted to be coupled to a switching terminal. The switch is configured to generate a switching signal having first and second states at the switching terminal. Ripple generating circuitry is adapted to be coupled to the switching terminal and is configured to: generate a filtered signal based on the switching signal; and keep the filtered signal within a particular range. Loop control circuitry is coupled to the ripple generating circuitry and is configured to control the switch based on the filtered signal.

DETAILED DESCRIPTION

This description relates to converter systems with loop control. A converter system may include a switch coupled to a switching terminal of the DC-DC converter, a current feedback path coupled to the switch to generate a ripple signal in phase with an inductor current flowing through an inductor coupled to the switching terminal, and loop control circuitry coupled between the current feedback path and the switch to control on or off time of the switch in each switching cycle. The on or off time of the switch in each switching cycle is determined based on a combination of the ripple signal and a feedback voltage of an output voltage of the converter system. A feedback loop includes the current feedback path and the loop control circuitry. The loop control circuitry is configured to regulate the output voltage by controlling the on or off time of the switch. In one control paradigm, the switch is switched between on and off states based on a peak value of the combination of the ripple signal and the feedback voltage. In another control paradigm, the switch is switched between the on and off states based on a valley value of the combination of the ripple signal and the feedback voltage.

Figure 1:
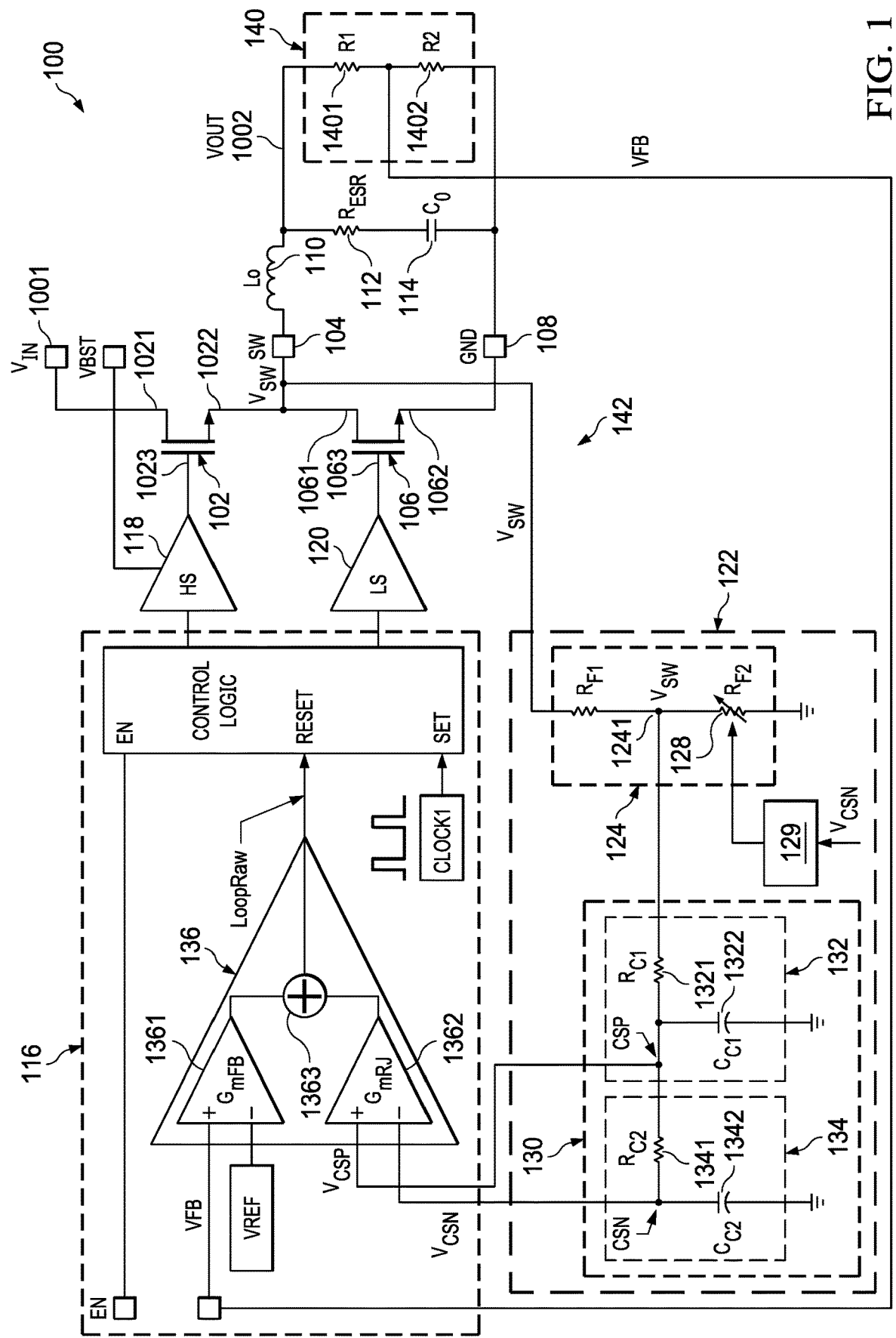
FIG. 1 is a schematic circuit diagram of a converter system in an implementation of this description.

FIG. 1 is a schematic block diagram of a converter system 100 in an implementation of this description. For example, FIG. 1 shows a buck DC-DC converter system 100 with fixed-frequency peak ripple mode control topology. The converter system 100 is configured to convert an input voltage $V_{IN}$ received at an input terminal 1001 of the converter system 100 to an output voltage $V_{OUT}$ generated at an output terminal 1002 of the converter system 100. The converter system 100 includes a first switch 102 having a first terminal 1021 coupled to the input terminal 1001 of the converter system 100, a second terminal 1022 coupled to a switching terminal SW 104 of the converter system 100, and a control terminal 1023. The converter system 100 may include a second switch 106 having a first terminal 1061 coupled to the switching terminal SW 104, a second terminal 1062 coupled to a voltage supply terminal 108 (such as a ground terminal GND), and a control terminal 1063. The converter system 100 includes an output inductor $L_O$ 110 coupled between the switching terminal SW 104 and the output terminal 1002 of the converter system 100, and an output capacitor $C_O$ 112 having parasitic resistance $R_{ESR}$ 114. The output capacitor 112 is coupled between the output terminal 1002 of the converter system 100 and the voltage supply terminal 108.

The converter system 100 includes loop control circuitry 116 coupled to the first and second switches 102 and 106, and configured to generate switch control signals HSD_ON and LSD_ON to alternately: (a) switch the first switch 102 to a first state (such as an on state) and the second switch 106 to a second state (such as an off state), to thereby allow a first current to flow from the input terminal 1001 to the switching terminal SW 104 towards the output terminal 1002 of the converter system 100; and (b) switch the first switch 102 to the second state and the second switch 106 to the first state, to thereby allow a second current to flow from the ground terminal 108 to the switching terminal SW 104 towards the output terminal 1002. The first and second switches 102 and 106, also named respectively as high side and low side switches, can be transistors, such as metal oxide semiconductor field effect transistors (MOSFETs) that are respectively controlled by the switch control signals HSD_ON and LSD_ON received from the loop control circuitry 116 through a high side driver 118 and a low side driver 120.

The converter system 100 also includes ripple generating circuitry 122 coupled to the switching terminal SW 104 and configured to generate a ripple signal $V_{RIPPLE}$ based on a switching signal $V_{SW}$ at the switching terminal SW 104. In one example, the ripple signal $V_{RIPPLE}$ is provided as a difference between a first-order filtered signal and a second-order filtered signal of an adjusted switching signal $V_{SW}'$ proportional to the switching signal $V_{SW}$.

In one example, the ripple generating circuitry 122 includes an adjustable voltage divider 124 coupled to the switching terminal SW 104. The adjustable voltage divider 124 is configured to generate an adjusted switching signal $V_{SW}'$ having an amplitude based on an amplitude of the switching signal $V_{SW}$ and a voltage division ratio of the adjustable voltage divider 124. In one example, the adjustable voltage divider 124 includes a first resistive element 126 having resistance $R_{F1}$ and a second resistive element 128 having resistance $R_{F2}$. The first and second resistive elements 126 and 128 are coupled in series between the switching terminal SW 104 and the ground terminal 108. An output terminal 1241 of the adjustable voltage divider 124 is a joint terminal of the first and second resistive elements 126 and 128. The output terminal 1241 provides the adjusted switching signal $V_{SW}'$.

In one example, at least one of the first and second resistive elements 126 and 128 has an adjustable resistance. In the example of FIG. 1, the first resistive element 126 is a resistor having resistance $R_{F1}$, and the second resistive element 128 has an adjustable resistance $R_{F2}$. The ripple generating circuitry 122 includes a resistance control circuitry 129 coupled to the second resistive element 128 and configured to adjust the resistance $R_{F2}$ of the second resistive element 128 so as to adjust the adjusted switching signal $V_{SW}'$.

The ripple generating circuitry 122 also includes a ripple signal generator 130 coupled to the output terminal 1241 of the adjustable voltage divider 124. The ripple signal generator 130 includes: a first RC filter 132 having a first resistor 1321 with a resistance $R_{C1}$; and a first capacitor 1322 having a capacitance $C_{C1}$ coupled in series between the output terminal 1241 of the adjustable voltage divider 124 and the ground terminal 108. The first RC filter 132 is configured to generate a first-order filtered signal $V_{CSP}$ at an output terminal CSP, which is a joint terminal between the first resistor 1321 and the first capacitor 1322. The ripple signal generator 130 also includes: a second RC filter 134 having a second resistor 1341 with a resistance $R_{C2}$; and a second capacitor 1342 having a capacitance $C_{C2}$ coupled in series between the output terminal CSP of the first RC filter 132 and the ground terminal 108. The second RC filter 134 is configured to generate a second-order filtered signal $V_{CSN}$ at an output terminal CSN, which is a joint terminal between the second resistor 1341 and the second capacitor 1342. The ripple signal $V_{RIPPLE}$ is provided based on a difference between the first-order filtered signal $V_{CSP}$ and the second-order filtered signal $V_{CSN}$, such as $V_{RIPPLE} = V_{CSP} - V_{CSN}$. In one example, the resistance control circuitry 129 is configured to adjust the resistance $R_{F2}$ of the second resistive element 128 based on the second-order filtered signal $V_{CSN}$.

The loop control circuitry 116 includes a comparator 136 coupled to the ripple signal generator 130, and configured to generate a loop control signal LoopRaw based on a combination of a feedback voltage $V_{FB}$ proportional to the output voltage $V_{OUT}$ of the converter system 100, a reference voltage $V_{REF}$, and the ripple signal $V_{RIPPLE}$. In one example, the comparator 136 includes a first non-inverting input configured to receive the feedback voltage $V_{FB}$, a first inverting input configured to receive the reference voltage $V_{REF}$, a second non-inverting input coupled to the output terminal of the first RC filter 132 and configured to receive the first-order filtered signal $V_{CSP}$, a second inverting input coupled to the output terminal of the second RC filter 134 and configured to receive the second-order filtered signal $V_{CSN}$, and an output terminal configured to provide the loop control signal LoopRaw. In one example, the comparator 136 includes a first amplifier 1361 having a gain of $G_{mFB}$. The first amplifier 1361 amplifies the difference between the feedback voltage $V_{FB}$ and the reference voltage $V_{REF}$. The comparator 136 also includes a second amplifier 1362 having a gain of $G_{mRJ}$. The second amplifier 1362 amplifies the difference between the first-order filtered signal $V_{CSP}$ and the second-order filtered signal $V_{CSN}$. The comparator 136 includes a combination logic 1363 that sums outputs of the first and second amplifiers 1361 and 1362, and generates the loop control signal LoopRaw. In one example, the loop control signal LoopRaw is asserted responsive to $G_{mFB} \cdot (V_{FB} - V_{REF}) + G_{mRJ} \cdot (V_{CSP} - V_{CSN})$ being greater than zero.

The loop control circuitry 116 includes a control logic 138 coupled to the comparator 136. The control logic 138 includes a first input terminal Reset coupled to the output terminal of the comparator 136, a second input terminal SET configured to receive a first clock signal CLOCK1, a first output terminal HSD_ON coupled to the high side driver 118, and a second output terminal LSD_ON coupled to the low side driver 120. The first clock signal CLOCK1 may be provided: by an external clock generator separate from the loop control circuitry 116; or by an internal clock generator within the loop control circuitry 116.

In one example, the switch control signal HSD_ON is set to logic high, and the switch control signal LSD_ON is cleared to logic low to switch on the first switch 102 and switch off the second switch 106 responsive to a first edge (such as a rising edge) of the first clock signal CLOCK1. The switch control signal HSD_ON is cleared to logic low, and the switch control signal LSD_ON is set to logic high to switch off the first switch 102 and switch on the second switch 106 responsive to the loop control signal LoopRaw being set from logic low to logic high.

In one example, the converter system 100 includes a voltage divider 140 coupled to the output terminal 1002 of the converter system 100, and configured to generate the feedback voltage $V_{FB}$ proportional to the output voltage $V_{OUT}$. In one example, the voltage divider 140 includes third and fourth resistors 1401 and 1402 coupled in series between the output terminal 1002 and the ground terminal GND 108. The first resistor 1401 has a resistance $R_1$, and the second resistor 1402 has a resistance $R_2$. The feedback voltage $V_{FB}$ is provided at a joint terminal between the third and fourth resistors 1401 and 1402. A feedback loop 142 is formed by the ripple generating circuitry 122, the loop control circuitry 116, the first and second drivers 118 and 120, the first and second switches 102 and 106, the output inductor 110, the output capacitor $C_O$ 112 and the voltage divider 140.

Figure 2:
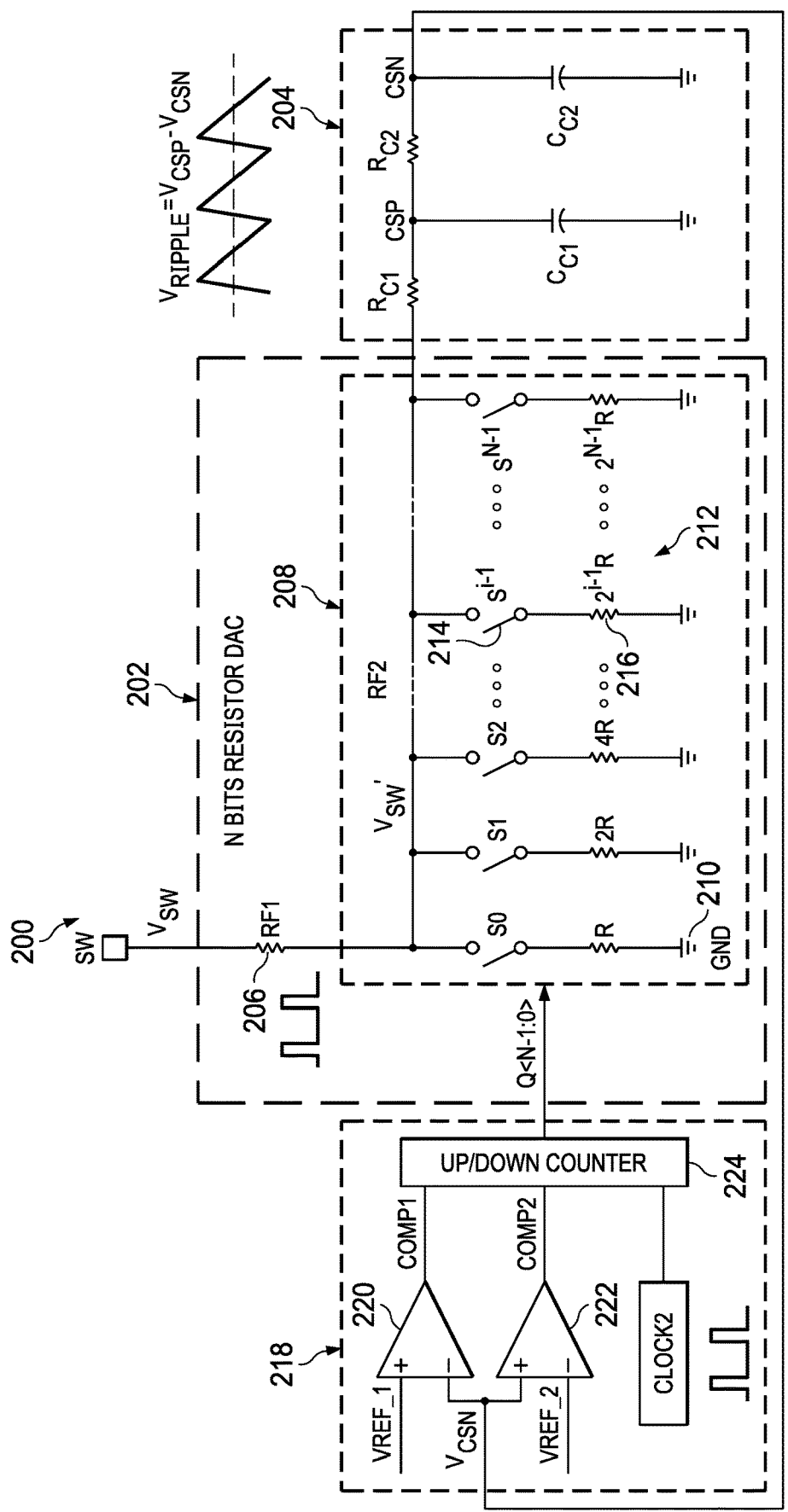
FIG. 2 is a schematic circuit diagram of ripple generating circuitry of a converter system in an implementation of this description.

FIG. 2 is an example schematic circuit diagram of a ripple generating circuitry 200, such as the ripple generating circuitry 122 of the converter system 100 of FIG. 1, in an implementation of this description. The ripple generating circuitry 200 includes: an adjustable voltage divider 202, such as the adjustable voltage divider 124 of the converter system 100 of FIG. 1; and a ripple signal generator 204 coupled to the adjustable voltage divider 202. In one example, the ripple signal generator 204 is same as the ripple signal generator 130 of the converter system 100 of FIG. 1. The ripple signal generator 204 generates a first-order filtered signal $V_{CSP}$ and a second-order filtered signal $V_{CSN}$.

In the example of FIG. 2, the adjustable voltage divider 202 includes: a first resistor 206 having a resistance of $R_{F1}$; and a second resistor 208 having adjustable resistance $R_{F2}$.

The first resistor 206 is coupled between: a switching terminal SW 207 of a converter system, such as the switching terminal SW 104 of FIG. 1 that generates a switching signal $V_{SW}$; and a joint terminal between the first and second resistors 206 and 208, which is an output terminal of the adjustable voltage divider 202 that provides an adjusted switching signal $V_{sw}'$. In one example, the second resistor 208 is an N-bit resistor digital-to-analog converter (DAC), which includes N controllable resistive paths coupled in parallel between the first resistor 206 and a ground terminal GND 210, where N is an integer greater than 1. Each resistive path includes a switch and a resistor coupled in series between the first resistor 206 and the ground terminal GND 210. For example, an $i^{th}$ resistive path 212 includes an $i^{th}$ switch $S_{i-1}$ 214 and an $i^{th}$ resistor 216 having a resistance of $2^{i-1}R$, where i is an integer $1 \leq i \leq N$, and R is a particular resistance value.

The ripple generating circuitry 200 also includes resistance control circuitry 218 coupled to the second resistor 208 and configured to selectively enable the switches of the N resistive paths of the second resistor 208 based on the second-order filtered signal $V_{CSN}$, so as to maintain the second-order filtered signal $V_{CSN}$ within a particular range. The resistance control circuitry 218 includes a first comparator 220 and a second comparator 222. The first comparator 220 has a non-inverting input terminal configured to receive a first reference voltage $V_{REF\_1}$, an inverting input terminal coupled to the ripple signal generator 204 and configured to receive the second-order filtered signal $V_{CSN}$, and a first comparator output terminal configured to generate a first counter control signal Comp1. The second comparator 222 has a non-inverting input terminal coupled to the ripple signal generator 204 and configured to receive the second-order filtered signal $V_{CSN}$, an inverting input terminal configured to receive a second reference voltage $V_{REF\_2}$, and a second comparator output terminal configured to generate a second counter control signal Comp2. In one example, the first reference voltage $V_{REF\_1}$ is less than the second reference voltage $V_{REF\_2}$.

The resistance control circuitry 218 also includes an up-down counter 224 having a first control input terminal coupled to the first comparator output terminal of the first comparator 220, a second control input terminal coupled to the second comparator output terminal of the second comparator 222, and an output terminal configured to generate a count value, such as an N-bit count value Q<N−1, 0>. The up-down counter 224 generates the N-bit count value Q<N−1, 0> based on the first counter control signal Comp1, the second counter control signal Comp2, and a second clock signal CLOCK2. The second clock signal CLOCK2 may be provided: by an external clock generator separate from the resistance control circuitry 218; or by an internal clock generator within the resistance control circuitry 218.

The N-bit count value Q<N−1, 0> is provided to control the N switches of the N resistive paths to selectively couple one or more resistors of the N resistors of the N resistive paths between the first resistor 206 and the ground terminal GND 210. In one example, the $i^{th}$ bit from the most significant bit (MSB) of the count value Q<N−1, 0>, i.e. the bit Q[N−i], controls the $i^{th}$ switch $S_{i-1}$ Responsive to Q[N−i] being logic high, the $i^{th}$ switch $S_1.1$ is closed to couple the $i^{th}$ resistor $2^{i-1}R$ between the first resistor 206 and the ground terminal GND 210.

In operation, responsive to each rising edge of the second clock signal CLOCK2, or responsive to each falling edge of the second clock signal CLOCK2, the up-down counter 224 updates the N-bit count value Q<N−1, 0> based on: a difference between the second-order filtered signal $V_{CSN}$ and the first reference voltage VREF_1; and a difference between the second-order filtered signal $V_{CSN}$ and the second reference voltage $V_{REF\_2}$. Responsive to the second-order filtered signal $V_{CSN}$ being less than the first reference voltage $V_{REF\_1}$, the first counter control signal Comp1 is asserted to count-down the count value Q<N−1, 0>, such that the resistance $R_{F2}$ increases with decreasing of the N-bit count value Q<N−1, 0>, thereby increasing the adjusted switching voltage $V_{sw}'$ to increase the second-order filtered signal $V_{CSN}$. Responsive to the second-order filtered signal $V_{CSN}$ being greater than the second reference voltage $V_{REF\_2}$, the second counter control signal Comp2 is asserted to count-up the count value Q<N−1, 0>, such that the resistance $R_{F2}$ decreases with increasing of the N-bit count value Q<N−1, 0>, thereby decreasing the adjusted switching voltage $V_{sw}'$ to decrease the second-order filtered signal $V_{CSN}$. Therefore, the second-order filtered signal $V_{CSN}$ is maintained with a range determined by the first and second reference voltages $V_{REF\_1}$ and $V_{REF\_2}$. In one example: (a) the first reference voltages $V_{REF\_1}$ is configured to be greater than a particular value, determined based on a desired output voltage of the converter system 100 by one step of an output voltage of the N-bit resistor DAC formed by the second resistor 208; and (b) the second reference voltages $V_{REF\_2}$ is configured to be less than the particular value by one step of the output voltage of the N-bit resistor DAC formed by the second resistor 208, so as to limit the second-order filtered signal $V_{CSN}$ around the particular value and keep the converter system 100 stable.

Figure 3:
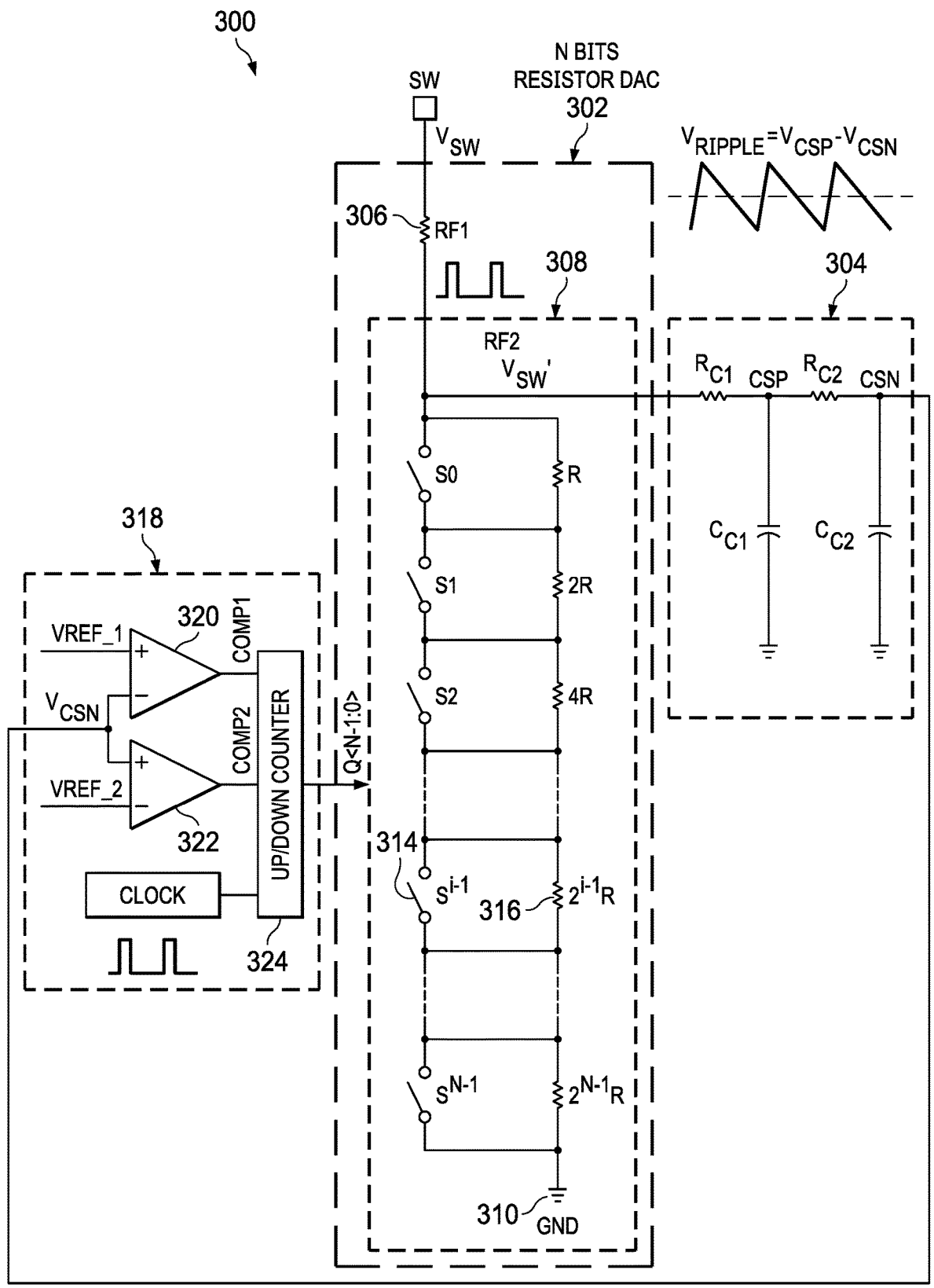
FIG. 3 is a schematic circuit diagram of ripple generating circuitry of a converter system in another implementation of this description.

FIG. 3 is a schematic circuit diagram of a ripple generating circuitry 300, such as the ripple generating circuitry 122 of the converter system 100 of FIG. 1, in another implementation of this description. Similar to the ripple generating circuitry 200, the ripple generating circuitry 300 includes an adjustable voltage divider 302 and a ripple signal generator 304. The adjustable voltage divider 302 includes a first resistor 306 having a resistance of $R_{F1}$ and a second resistor 308 having adjustable resistance $R_{F2}$. The first resistor 306 is coupled between: a switching terminal SW of a converter system; and a joint terminal between the first and second resistors 306 and 308, which is an output terminal of the adjustable voltage divider 302 that provides an adjusted switching signal $V_{sw}'$. Different from the second resistor 208 of FIG. 2, the second resistor 308 may include N resistors coupled in series between the output terminal of the adjustable voltage divider 302 and the ground terminal GND 310, where N is an integer greater than 1. For example, an $i^{th}$ switch $S_{i-1}$ 314 is coupled in parallel with an $i^{th}$ resistor 316 having a resistance of $2^{i-1}R$, where i is an integer $1 \leq i \leq N$, and R is a particular resistance value.

The adjustable resistance $R_{F2}$ is controlled by a resistance control circuitry 318, which is similar to the resistance control circuitry 218 of FIG. 2. Each of the N switches is controlled by a respective bit of the count value Q<N−1, 0> provided by the up-down counter 324. In one example, the $i^{th}$ bit from the least significant bit (LSB) of the count value Q<N−1, 0>, i.e. the bit Q[i], controls the $i^{th}$ switch $S_{i-1}$. Responsive to Q[N−i] being logic high, the $i^{th}$ switch $S_i-1$ is closed to couple the $i^{th}$ resistor $2^{i-1}R$ between the first resistor 206 and the ground terminal GND 210.

The $i^{th}$ switch 314 is closed responsive to the respective bit of the count value Q<N−1, 0> being cleared to logic low. Responsive to the second-order filtered signal $V_{CSN}$ being less than the first reference voltage $V_{REF\_1}$, determined by the first comparator 320, the first counter control signal Comp1 is asserted to count-up the count value Q<N−1, 0>, such that the resistance $R_{F2}$ increases with increasing of the N-bit count value Q<N−1, 0>, thereby increasing the adjusted switching voltage $V_{sw}'$ to increase the second-order filtered signal $V_{CSN}$. Responsive to the second-order filtered signal $V_{CSN}$ being greater than the second reference voltage $V_{REF\_2}$, determined by the second comparator 322, the second counter control signal Comp2 is asserted to count-down the count value Q<N−1, 0>, such that the resistance $R_{F2}$ decreases with decreasing of the N-bit count value Q<N−1, 0>, thereby decreasing the adjusted switching voltage $V_{sw}'$ to decrease the second-order filtered signal $V_{CSN}$. Therefore, the second-order filtered signal $V_{CSN}$ is maintained with a range determined by the first and second reference voltages $V_{REF\_1}$ and $V_{REF\_2}$.

Figure 4:
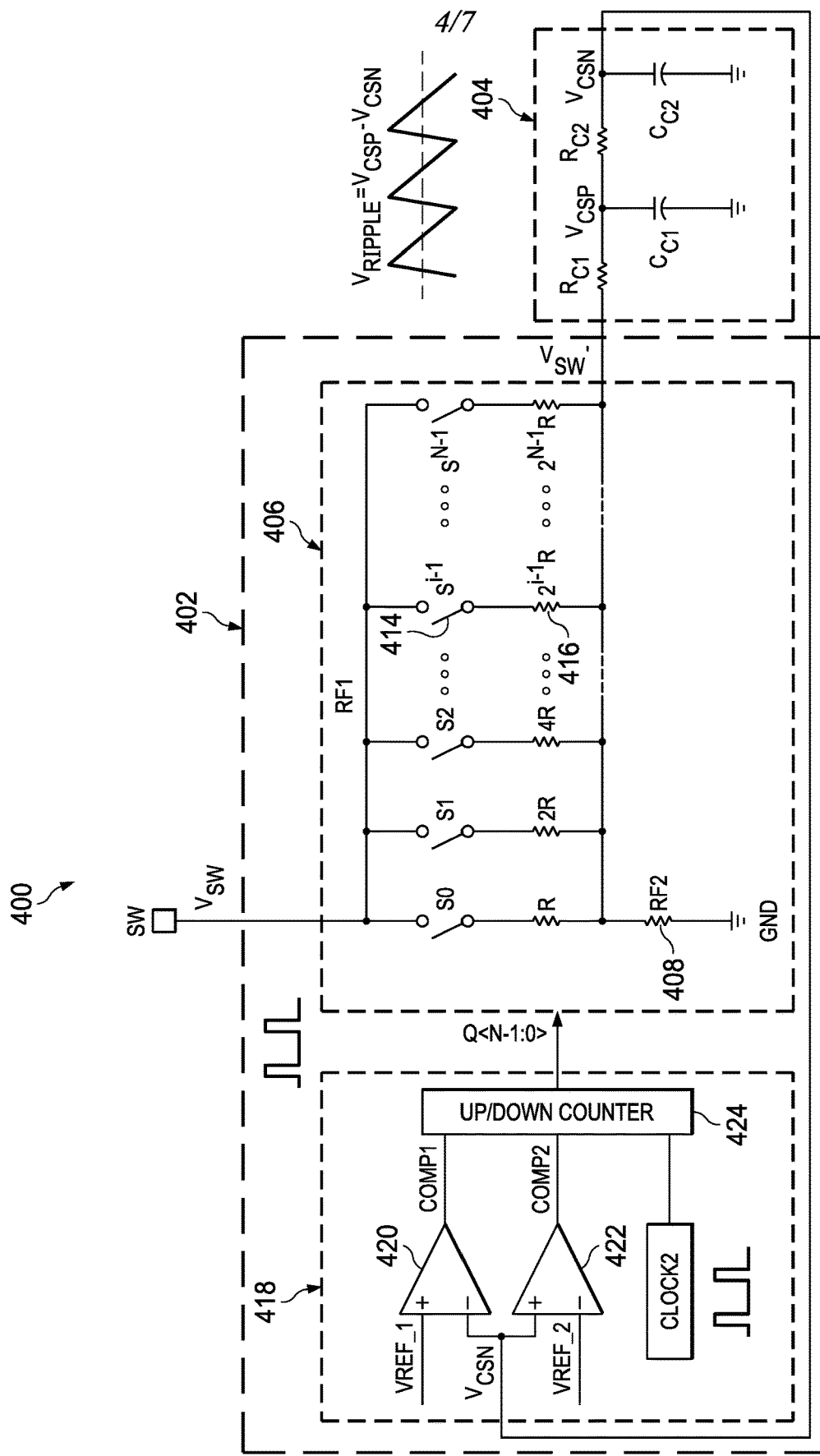
FIG. 4 is a schematic circuit diagram of ripple generating circuitry of a converter system in yet another implementation of this description.

FIG. 4 is a schematic circuit diagram of a ripple generating circuitry 400, such as the ripple generating circuitry 122 of the converter system 100 of FIG. 1, in yet another implementation of this description. Similar to the ripple generating circuitry 200, the ripple generating circuitry 400 includes an adjustable voltage divider 402 and a ripple signal generator 404. The adjustable voltage divider 402 includes a first resistor 406 having adjustable resistance of $R_{F1}$ and a second resistor 408 having a resistance $R_{F2}$. The first resistor 406 is coupled between: a switching terminal SW of a converter system; and a joint terminal between the first and second resistors 406 and 408, which is an output terminal of the adjustable voltage divider 402 providing an adjusted switching signal $V_{sw}'$. Different from the adjustable voltage divider 202 of FIG. 2, the first resistor 406 has an adjustable resistance $R_{F1}$, and the second resistor 408 has a non-adjustable resistance $R_{F2}$. The first resistor 406 includes N controllable resistive paths coupled in parallel between the switching terminal 410 and the second resistor 408, where N is an integer greater than 1. Each resistive path includes a switch and a resistor coupled in series between the switching terminal 410 and the second resistor 408. For example, an $i^{th}$ resistive path 412 includes an $i^{th}$ switch $S_{i-i}$ 414 and an $i^{th}$ resistor 416 having a resistance of $2^{i-1}R$, where i is an integer 1≤i≤N, and R is a particular resistance value.

The adjustable resistance $R_{F1}$ is controlled by a resistance control circuitry 418, which is similar to the resistance control circuitry 218 of FIG. 2. Each of the N switches is controlled by a respective bit of the count value Q<N−1, 0> provided by the up-down counter 424. The $i^{th}$ bit from the most significant bit (MSB) of the count value Q<N−1, 0>, i.e. the bit Q[N−i], controls the $i^{th}$ switch $S_{i-1}$. Responsive to Q[N−i] being logic high, the $i^{th}$ switch $S_i$.1 is closed to couple the $i^{th}$ resistor $2^{i-1}R$ between the switching terminal 410 and the second resistor 408. Responsive to the second-order filtered signal $V_{CSN}$ being less than the first reference voltage $V_{REF\_1}$, determined by the first comparator 420, the first counter control signal Comp1 is asserted to count-down the count value Q<N−1, 0>, such that the resistance $R_{F1}$ decreases with decreasing of the N-bit count value Q<N−1, 0>, thereby increasing the adjusted switching voltage $V_{sw}'$ to increase the second-order filtered signal $V_{CSN}$. Responsive to the second-order filtered signal $V_{CSN}$ being greater than the second reference voltage $V_{REF\_2}$, determined by the second comparator 422, the second counter control signal Comp2 is asserted to count-up the count value Q<N−1, 0>, such that the resistance $R_{F1}$ increases with increasing of the N-bit count value Q<N−1, 0>, thereby decreasing the adjusted switching voltage $V_{sw}'$ to decrease the second-order filtered signal $V_{CSN}$. Therefore, the second-order filtered signal $V_{CSN}$ is maintained with a range determined by the first and second reference voltages $V_{REF\_1}$ and $V_{REF\_2}$.

Figure 5:
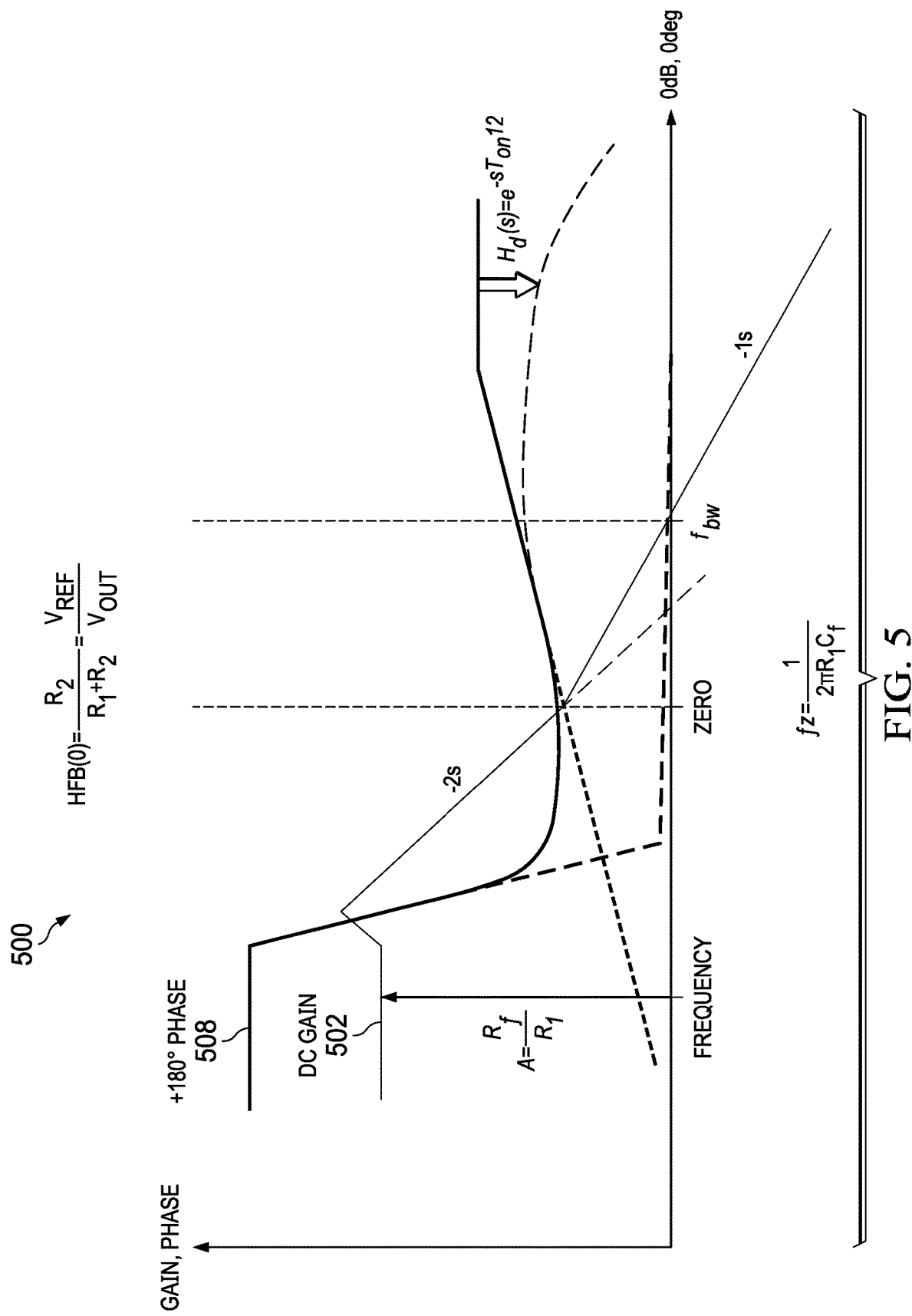
FIG. 5 is a Bode plot of gain and phase of a feedback loop of a converter system in an implementation of this description.

FIG. 5 is a Bode plot 500 of gain and phase of a feedback loop of a converter system in an implementation of this description. A bandwidth $f_{bw}$ of the converter system 100 is based on an intersection point of the DC Gain 502 of the feedback loop and the X-axis. The converter system 100 operates in a constant frequency control mode with a switching frequency $f_{sw}$. The loop bandwidth of the converter system 100 satisfies $f_{BW}=f_{0dB}<1/8 f_{SW}$.

Practically, considering transient response and stability of the converter system 100, it is better to set the loop bandwidth between $2/20 f_{SW}$ and $2/5 f_{SW}$. The converter system 100 has two low frequency L/C complex poles 504 and 506 and one internal compensation zero point ZERO. The zero point ZERO is based on an intersection point of the DC Gain 502 of the feedback loop and the phase 508 of the converter system 100. If ZERO is within the bandwidth of the converter system 100, the feedback loop is stable.

The DC gain DC_Gain of the feedback loop has the feature shown as below:

$$\text{DC\_Gain} \propto \frac{G_{mFB}}{G_{mRJ}} \cdot \frac{R_{F1} + R_{F2}}{R_{F2}} \cdot \frac{V_{REF}}{V_{OUT}}, \quad (1)$$

where $G_{mFB}$ is the gain of the first amplifier of the comparator 136, and $G_{mRJ}$ is the gain of the second amplifier of the comparator 136. Therefore, when the resistances $R_{F1}$ and $R_{F2}$ are both fixed, the DC gain of the feedback loop changes with the change of the output voltage $V_{OUT}$, which causes the converter system 100 unstable.

The bandwidth of the feedback loop is variable with the output voltage $V_{OUT}$, which causes difficulty in the feedback loop design. For example, in a high $V_{OUT}$ condition, the DC gain is low, and the bandwidth of the converter system 100 will decrease with the DC gain decreasing, which will affect transient performance of the converter system 100. Also, if zero point ZERO is out of the bandwidth of the converter system, a stability issue will exist.

In a low $V_{OUT}$ condition, the DC gain is high, the bandwidth of the converter system 100 will increase with the DC Gain increasing. If $f_{0dB}<1/2 f_{SW}$, a sub-harmonic oscillation issue will exist in the converter system.

Table 1 shows simulation results of a converter system with a fixed voltage divider in the ripple generating circuitry 122. In the converter system: R1=175 Kohm; R2=75 Kohm; Rc=1.5 Mohm; Cc=7.5 pF; switching frequency $f_{sw}$=500 Khz; and $G_{mFB}/G_{mRJ}$=8. The inductance pL of output inductor Lo is selected as $0.4*I_{OUT\_max}$(3A), and the capacitance Cout of the output capacitor Co has a derating value based on a 44 uF capacitor.

TABLE 1

AC simulation data in different conditions

| VIN (V) | VOUT (V) | pL (uH) | Cout (uF) | DC Gain (dB @ 1 Khz) | BandWidth (Khz) | Phase Margin (Degree) | |
|---|---|---|---|---|---|---|---|
| 24 | 17 | 10 | 12 | 24.3 | 35.8 | 37 | Too Low Bandwidth |
| 19 | 12 | 6.8 | 15 | 25.6 | 43.7 | 41 | |
| 19 | 5 | 5.6 | 20 | 33.2 | 71.5 | 46.3 | |
| 19 | 3.3 | 4.7 | 28 | 36.8 | 85 | 48.1 | |
| 19 | 2.5 | 2.2 | 32 | 39.2 | 166 | 49.5 | |
| 19 | 1.05 | 1.5 | 41 | 46.7 | 340 | 47.3 | Bandwidth > ½ Fsw |
| 19 | 0.8 | 2.2 | 44 | 48.4 | 413 | 50 | |

As shown in Table 1, the bandwidth of the feedback loop is too low in high $V_{OUT}$ conditions, such as VOUT=12V or VOUT=17V, which causes bad transient performance. Also, the bandwidth is higher than ⅓ $f_{sw}$ in low $V_{OUT}$ conditions, such as VOUT=0.8V or VOUT=1.05V, which causes sub-harmonic oscillation issue.

As $$V_{CSN} = \frac{R_{F2}}{R_{F1} + R_{F2}} \times V_{OUT},$$

the DC gain of the feedback loop can satisfy the following relationship:

$$DC\_Gain \propto \frac{G_{mFB}}{G_{mRJ}} \cdot \frac{R_{F1} + R_{F2}}{R_{F2}} \cdot \frac{V_{REF}}{V_{OUT}} = \frac{G_{mFB}}{G_{mRJ}} \cdot \frac{V_{OUT}}{V_{CSN}} \cdot \frac{V_{REF}}{V_{OUT}} = \frac{G_{mFB}}{G_{mRJ}} \cdot \frac{V_{REF}}{V_{CSN}} \quad (2)$$

Therefore, maintaining the second-order filtered signal $V_{CSN}$ within a particular range can keep the DC gain of the feedback loop constant, regardless of the change in output voltage $V_{OUT}$ of the converter system 100.

Figure 6:
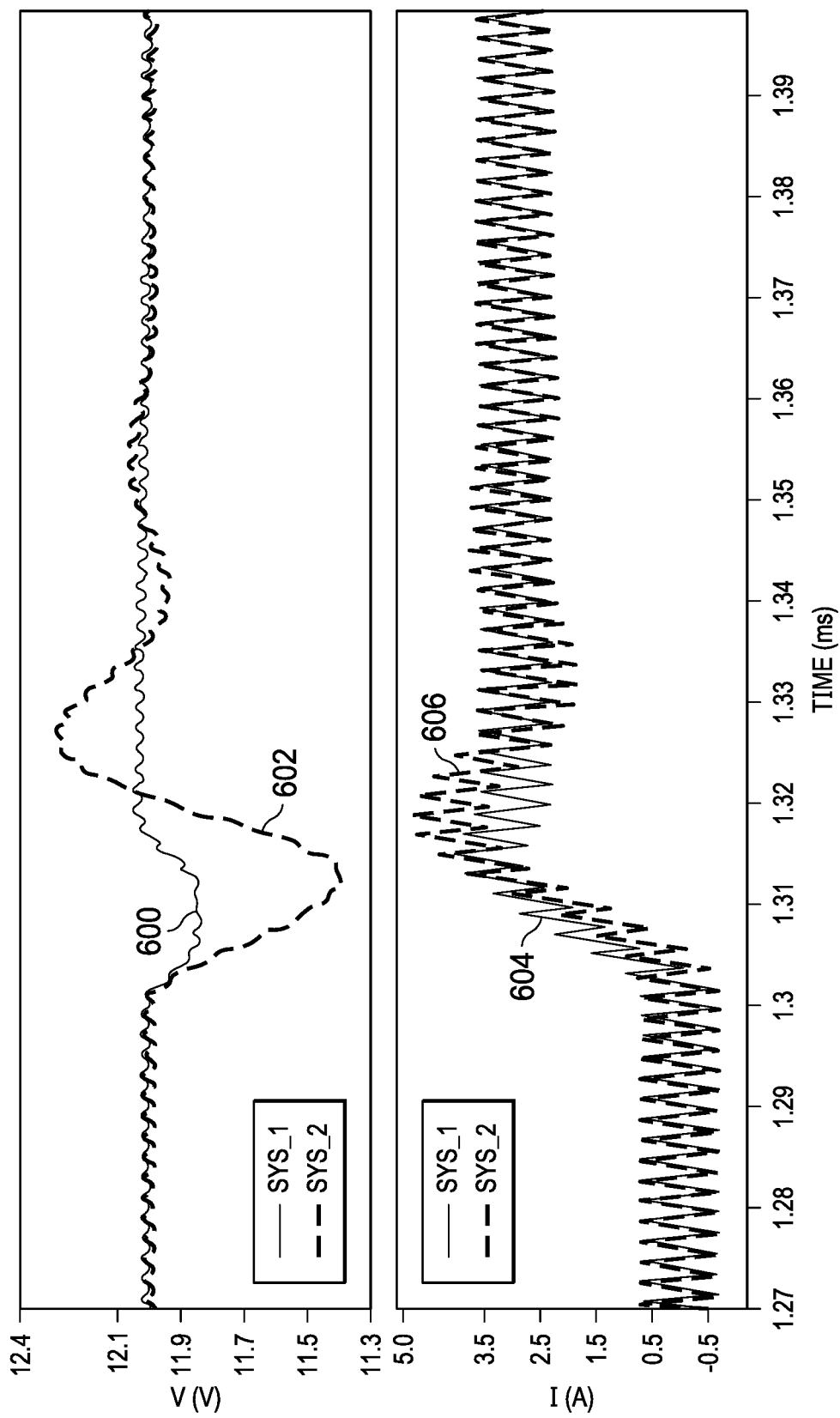
FIG. 6 shows a comparison of simulation results of waveforms of the converter system of FIG. 1 and a converter system having a fixed voltage divider in the ripple generating circuitry when the output voltage is high.

FIG. 6 shows a comparison of simulation results of waveforms of a first converter system SYS_1 (which is the converter system 100 of FIG. 1) and a second converter system SYS_2 having a fixed voltage divider in the ripple generating circuitry 122 in a high output voltage $V_{OUT}$ condition. For each of the two converter systems in the comparison, the input voltage $V_{IN}$ is 19V, a designed output voltage $V_{OUT}$ is 12V, the inductance of Lo is 6.8 pH, the capacitance of Co is 12 μF, and the switching frequency $f_{sw}$ is 500 KHz. The simulation results show: (a) in the first converter system SYS_1, with the increase of the average value of the inductor current IL_SYS_1 600, the output voltage VOUT_SYS_1 602 has a minor undershoot and returns to stay at 12V in less than 0.02 ms; and (b) in the second converter system SYS_2, with the increase of the inductor current IL_SYS_2 604, the output voltage VOUT_SYS_2 606 has a larger undershoot and returns to stay at 12V in more than 0.06 ms. The simulation results show that loop transient performance of the converter system 100 of FIG. 1 is much better than the converter system with a fixed voltage divider in both undershoot and stability.

Figure 7:
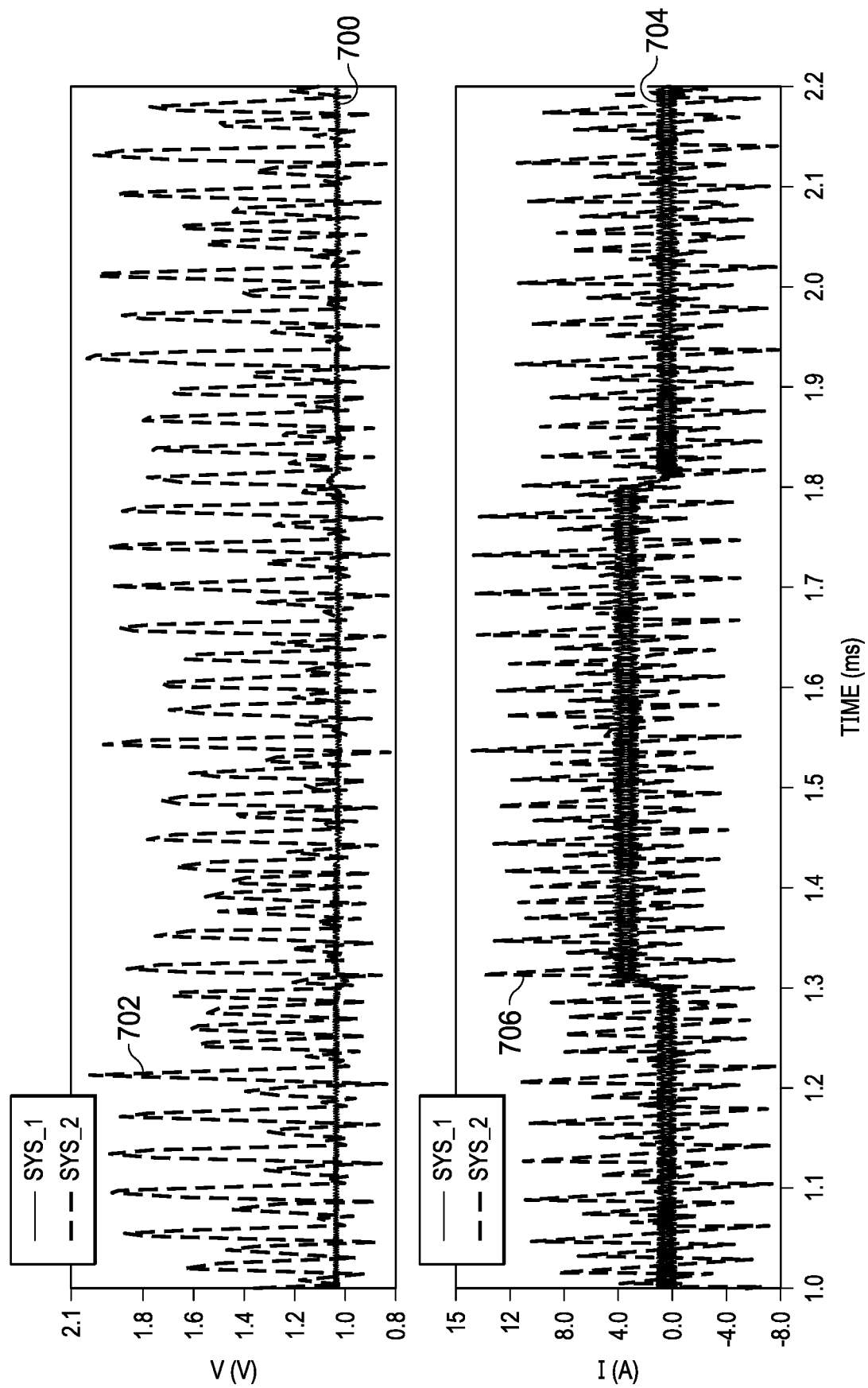
FIG. 7 shows a comparison of simulation results of waveforms of the converter system of FIG. 1 and a converter system having a fixed voltage divider in the ripple generating circuitry when the output voltage is low.

FIG. 7 shows a comparison of simulation results of waveforms of the first converter system SYS_1 (which is the converter system 100 of FIG. 1) and the second converter system SYS_2 having a fixed voltage divider in the ripple generating circuitry 122 in a low output voltage $V_{OUT}$ condition. For each of the two converter systems in the comparison, the input voltage $V_{IN}$ is 19V, a designed output voltage $V_{OUT}$ is 1.05V, the inductance of Lo is 1.5 μH, the capacitance of Co is 41 g, and the switching frequency $f_{sw}$, is 500 KHz. In the first system SYS_1, the bandwidth is 151 KHz, the feedback loop is fast and stable, and the output voltage VOUT_SYS_1 700 returns quickly to 1.05V with a change in the average value of the inductor current IL_SYS_1 702. In the second system SYS_2, a sub-harmonic oscillation issue of the output voltage VOUT_SYS_2 704 and the inductor current IL_SYS_2 happens, because the bandwidth reaches 0.68*$f_{sw}$.

In this description, the term "couple" may cover connections, communications, or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C, if intervening component C does not alter the functional relationship between device A and device B, such that device B is controlled by device A via the control signal generated by device A.

Modifications are possible in the described examples, and other examples are possible, within the scope of the claims.

What is claimed is:

1. A converter system, comprising:
  a switch coupled to a switching terminal, the switch configured to generate a switching signal at the switching terminal, wherein the switching signal has first and second states;
  ripple generating circuitry coupled to the switching terminal, and including:
    an adjustable voltage divider coupled to the switching terminal, wherein the adjustable voltage divider is configured to provide an adjusted switching signal responsive to the switching signal and a voltage division ratio of the adjustable voltage divider;
    a ripple signal generator coupled to the adjustable voltage divider, and configured to provide a first-order filtered signal and a second-order filtered signal responsive to the adjusted switching signal; and
    resistance control circuitry having an input coupled to the ripple signal generator and an output coupled to the adjustable voltage divider, wherein the resistance control circuitry is configured to provide a resistance control signal to adjust the voltage division ratio responsive to the second-order filtered signal and a reference voltage; and a loop control circuit coupled to the ripple generating circuitry, and configured to control the switch responsive to the second-order filtered signal.

2. The converter system of claim 1, wherein the adjustable voltage divider includes:
an input coupled to the switching terminal;
an output coupled to the ripple signal generator;
first resistive circuitry coupled between the input and the output of the adjustable voltage divider; and
second resistive circuitry coupled between the output of the adjustable voltage divider and a voltage supply terminal, wherein a resistance of at least one of the first resistive circuitry or the second resistive circuitry is adjustable responsive to the resistance control signal.

3. The converter system of claim 2, wherein the reference voltage is a first reference voltage, and the resistance control circuitry is configured to:
decrease the voltage division ratio responsive to the second-order filtered signal being greater than the first reference voltage; and
increase the voltage division ratio responsive to the second-order filtered signal being less than a second reference voltage.

4. The converter system of claim 3, wherein the resistance control circuitry includes:
a first comparator having a first comparator output and first and second comparator inputs, wherein the first comparator input is configured to receive the first reference voltage, and the second comparator input is coupled to the ripple signal generator and configured to receive the second-order filtered signal, and the first comparator is configured to provide a first counter control signal at the first comparator output responsive to the first and second comparator inputs;
a second comparator having a second comparator output and third and fourth comparator inputs, wherein the third comparator input is coupled to the ripple signal generator and configured to receive the second-order filtered signal, and the second comparator input is configured to receive the second reference voltage, and the second comparator is configured to provide a second counter control signal at the second comparator output responsive to the third and fourth comparator inputs; and
an up-down counter having a counter output and first and second control inputs, wherein the first control input is coupled to the first comparator output, and the second control input is coupled to the second comparator output, the up-down counter is configured to provide a count value at the counter output responsive to the first and second control inputs.

5. The converter system of claim 4, wherein the second resistive circuitry includes resistors coupled in parallel between the switching terminal and the voltage supply terminal, in which each resistor is coupled in series with a respective switch, and each respective switch is configured to open or close responsive to the count value, so that a resistance of the second resistive circuitry is proportional to the count value.

6. The converter system of claim 4, wherein the second resistive circuitry includes resistors coupled in series between the switching terminal and the voltage supply terminal, in which each resistor is coupled in parallel with a respective switch, and the respective switch is configured to open or close responsive to the count value, so that a resistance of the second resistive circuitry is proportional to the count value.

7. The converter system of claim 4, wherein the first and second reference voltages are responsive to an output of the converter system, and a difference between the first and second reference voltages is based on a number of steps of the adjusted switching signal generated responsive to the count value.

8. A controller for a converter system, comprising:
ripple generating circuitry coupled to a switch of the converter system at a switching terminal having a switching signal, and including:
an adjustable voltage divider coupled to the switching terminal, the adjustable voltage divider configured to provide an adjusted switching signal responsive to the switching signal and a voltage division ratio of the adjustable voltage divider;
a ripple signal generator coupled to the adjustable voltage divider, and configured to provide a first-order filtered signal and a second-order filtered signal responsive to the adjusted switching signal; and
resistance control circuitry having a resistance input and a resistance output, wherein the resistance input is coupled to the ripple signal generator, and the resistance output is coupled to the adjustable voltage divider, the resistance control circuitry configured to provide a resistance control signal at the resistance output to adjust the voltage division ratio responsive to the second-order filtered signal and a reference voltage;
wherein the ripple generating circuitry is configured to:
generate a filtered signal responsive to a switching signal at the switching terminal; and
keep the filtered signal within a particular range; and
loop control circuitry coupled to the ripple generating circuitry and to the switch, and configured to control the switch responsive to the filtered signal.

9. The controller of claim 8, wherein the reference voltage is a first reference voltage, and the adjustable voltage divider includes:
a divider input coupled to the switching terminal;
a divider output coupled to the ripple signal generator;
first resistive circuitry coupled between the divider input and the divider output; and
second resistive circuitry coupled between the divider output and a voltage supply terminal; and
wherein a resistance of at least one of the first resistive circuitry or the second resistive circuitry is adjustable responsive to the resistance control signal, and the resistance control circuitry is configured to:
decrease the voltage division ratio responsive to the second-order filtered signal being greater than the first reference voltage; and
increase the voltage division ratio responsive to the second-order filtered signal being less than a second reference voltage.

10. The controller of claim 9, wherein the resistance control circuitry includes:
a first comparator having a first comparator output and first and second comparator inputs, wherein the first comparator input is configured to receive the first reference voltage, and the second comparator input is coupled to the ripple signal generator and configured to receive the second-order filtered signal, and the first comparator is configured to provide a first counter control signal at the first comparator output responsive to the first and second comparator inputs;
a second comparator having a second comparator output and third and fourth comparator inputs, wherein the third comparator input is coupled to the ripple signal generator and configured to receive the second-order filtered signal, and the fourth comparator input is configured to receive the second reference voltage, and the second comparator is configured to provide a second counter control signal at the second comparator output responsive to the third and fourth comparator inputs; and an up-down counter having a counter output and first and second control inputs, wherein the first control input is coupled to the first comparator output, and the second control input is coupled to the second comparator output, in which:

the up-down counter is configured to provide a count value at the counter output responsive to the first and second control inputs;

responsive to the second-order filtered signal being greater than the first reference voltage, the first counter control signal is asserted to count the count value in a first direction to decrease the resistance of the second resistive circuitry; and responsive to the second-order filtered signal being less than the second reference voltage, the second counter control signal is asserted to count the count value in a second direction to increase the resistance of the second resistive circuitry.

11. The controller of claim 10, wherein the second resistive circuitry includes resistors coupled in parallel between the switching terminal and the voltage supply terminal, in which each resistor is coupled in series with a respective switch, and the respective switch is configured to open or close responsive to the count value, so that a resistance of the second resistive circuitry is proportional to the count value.

12. The controller of claim10, wherein the second resistive circuitry includes resistors coupled in series between the switching terminal and the voltage supply terminal, in which each resistor is coupled in parallel with a respective switch, and the respective switch is configured to open or close responsive to the count value, so that a resistance of the second resistive circuitry is proportional to the count value.

13. A converter system, comprising:
a switch coupled to a switching terminal, wherein the switch is configured to generate a switching signal having first and second states at the switching terminal;
ripple generating circuitry that includes:
an adjustable voltage divider coupled to the switching terminal, wherein the adjustable voltage divider is configured to provide an adjusted switching signal responsive to:
the switching signal; and
a voltage division ratio of the adjustable voltage divider;
a ripple signal generator coupled to the adjustable voltage divider, and configured to provide a filtered signal based on the adjusted switching signal; and
resistance control circuitry having an input coupled to the ripple signal generator and an output coupled to the adjustable voltage divider, wherein the resistance control circuitry is configured to provide a resistance control signal for adjusting the voltage division ratio responsive to the filtered signal and a reference voltage.

14. The converter system of claim 13, wherein the adjustable voltage divider includes:
an input coupled to the switching terminal;
an output coupled to the ripple signal generator;
first resistive circuitry coupled between the input and the output of the adjustable voltage divider; and second resistive circuitry coupled between the output of the adjustable voltage divider and a voltage supply terminal, wherein a resistance of at least one of the first resistive circuitry or the second resistive circuitry is adjustable responsive to the resistance control signal to adjust the voltage division ratio.

15. The converter system of claim 14, wherein the reference voltage is a first reference voltage, and the resistance control circuitry is configured to decrease the voltage division ratio responsive to the filtered signal being greater than the first reference voltage, and to increase the voltage division ratio responsive to the filtered signal being less than a second reference voltage.

16. The converter system of claim 15, wherein the resistance control circuitry includes:
a first comparator having a first comparator output and first and second comparator inputs, wherein the first comparator input is coupled to a first reference terminal that provides the first reference voltage, the second comparator input is coupled to the ripple signal generator and configured to receive the filtered signal, and the first comparator is configured to provide a first counter control signal at the first comparator output;
a second comparator having a second comparator output and third and fourth comparator inputs, wherein the third comparator input is coupled to the ripple signal generator and configured to receive the filtered signal, the second comparator input is configured to receive the second reference voltage, and the second comparator is configured to provide a second counter control signal at the second comparator output; and
an up-down counter having an up-down output and first and second control inputs, wherein the first control input is coupled to the first comparator output, and the a second control input is coupled to the second comparator output, in which:
the up-down counter is configured to provide a count value at the up-down output responsive to the first and second control inputs;
responsive to the filtered signal being greater than the first reference voltage, the first counter control signal is asserted to count the count value in a first direction to decrease the resistance of the second resistive circuitry; and
responsive to the filtered signal being less than the second reference voltage, the second counter control signal is asserted to count the count value in a second direction to increase the resistance of the second resistive circuitry.

17. The converter system of claim 16, wherein the second resistive circuitry includes resistors coupled in parallel between the switching terminal and the voltage supply terminal, each respective resistor being coupled in series with a respective switch, and each respective switch being configured to selectively couple the respective resistor based on the count value, so that a resistance of the second resistive circuitry is proportional to the count value.

18. The converter system of claim 16, wherein the second resistive circuitry includes resistors coupled in series between the switching terminal and the voltage supply terminal, in which each respective resistor is coupled in parallel with a respective switch, and the respective switch is configured to selectively short the respective resistor based on the count value, so that a resistance of the second resistive circuitry is proportional to the count value.

* * * * *